Figure 2:
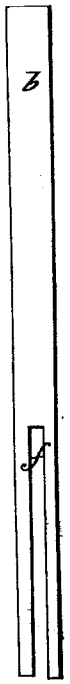
Figure 1:
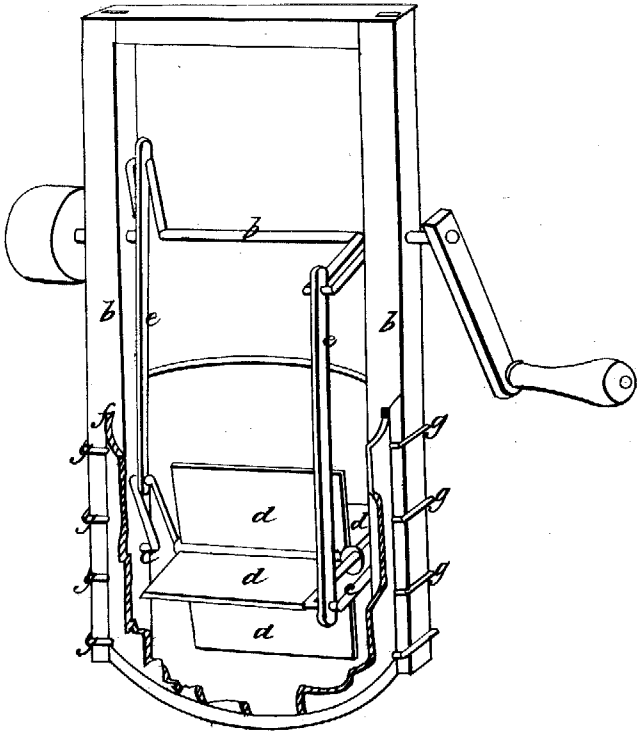
Figure 1:
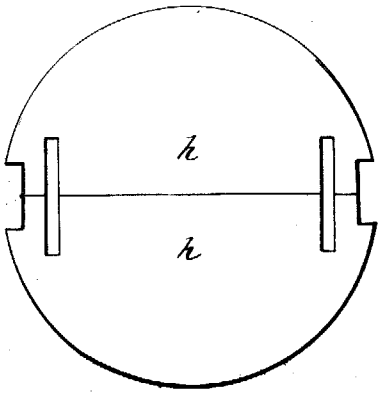

8566X

I. Brewster, No Printed Specification A

Churn.

Patented Jan. 7. 1835.

[illegible] Jan 7. 1835 37.

8566X I Iram Brewster Schoharie N.Y.

Letters Patent

The Schedule referred to in these letters Patent and making part of the same
Containing a description in the words of the said Iram Brewster himself
of his improvement in the Churn for making Butter from milk or Cream
To all persons to whom these presents shall Come. Be it known that
I Iram Brewster of the County of Schoharie and State of New York
have invented a new and useful improvement in the Churn, a full
and accurate description of which machine is as follows ...
2 An oblong frame of a width to correspond with the inside of
the Churn, and reaching to the bottom, extending also above the Churn
from Eight to twelve inches more or less according to the size of the Churn
to be used; about equidistant from the lid to the top of the frame there
extends a horizontal Shaft from one upright Standard to the other, one end
of this Shaft passes through one of the Standards and admits of a Crank
or pulley for turning the machine, On this Shaft there is formed two
Cranks near the inner sides of the upright Standards, these have from
three to Six inches [illegible] more or less and Stand at right angles with
each other. Another Shaft Similar to the above mentioned one Except
that neither End passes through the Standard, is affixed and turns in
the Standards from Six to ten inches from the bottom parallel with
the upper Shaft ...
These Shafts or Cranks are Connected together by two
pitmans extending from the upper to the lower Cranks and are
attached thereto, So by turning the upper Shaft with a crank or pulley,
the lower Shaft revolves accordingly ....
These Shafts are made of iron or other suitable
material. On the lower Shaft is affixed a set of wings or dashers, made
of wood or other Suitable material and of a Size Corresponding to the
size of the Churn. On the outside of the upright Standards two [illegible]
or pieces are cut out one from each Standard and forming a kind of
double Standard; these fit Closely to the inside of the Churn and by

8566X sliding into grooves or staples fixes the apparatus firmly to the Churn
The lid (in a round Churn) may be two Semi-Circles with oblong
apertures cut transversely to allow the pitmans to pass freely. —
This machine may be turned by hand, or water or dog power
In Witness whereof I have hereunto subscribed my name this twentieth
day of November one thousand Eight hundred and thirty four —

Witness
A. L. Smith.
Robert H. More

Aaron Brewster

455 [illegible]